(12) United States Patent
Takami et al.

(10) Patent No.: US 10,442,186 B2
(45) Date of Patent: Oct. 15, 2019

(54) INKJET PRINTER, AND CONTROL METHOD OF AN INKJET PRINTER

(71) Applicant: SEIKO EPSON CORPORATION, Tokyo (JP)

(72) Inventors: Toru Takami, Shiojiri (JP); Hiroyuki Endo, Shiojiri (JP)

(73) Assignee: SEIKO EPSON CORPORATION, Tokyo (JP)

(*) Notice: Subject to any disclaimer, the term of this patent is extended or adjusted under 35 U.S.C. 154(b) by 6 days.

(21) Appl. No.: 15/636,237

(22) Filed: Jun. 28, 2017

(65) Prior Publication Data
US 2018/0001622 A1 Jan. 4, 2018

(30) Foreign Application Priority Data

Jun. 29, 2016 (JP) ................. 2016-129053

(51) Int. Cl.
*B41J 2/045* (2006.01)
*B41J 3/407* (2006.01)
*B41J 29/38* (2006.01)
*G06K 15/00* (2006.01)
(Continued)

(52) U.S. Cl.
CPC ......... *B41J 2/0451* (2013.01); *B41J 2/04586* (2013.01); *B41J 2/16517* (2013.01); *B41J 3/4075* (2013.01); *B41J 29/38* (2013.01); *G06F 3/126* (2013.01); *G06F 3/1217* (2013.01); *G06F 3/1284* (2013.01); *G06K 15/402* (2013.01); *G06K 15/408* (2013.01); *G06K 15/4045* (2013.01); *B41J 2002/16573* (2013.01); *G06K 2215/101* (2013.01)

(58) Field of Classification Search
CPC ...... B41J 2/0451; B41J 2/16517; B41J 29/38; B41J 2/04586; B41J 3/4075; B41J 2002/16573; G06F 3/1284; G06F 3/126; G06F 3/1217; G06K 15/402; G06K 15/4045; G06K 15/408; G06K 2215/101
See application file for complete search history.

(56) References Cited

U.S. PATENT DOCUMENTS 6,290,322 B1 * 9/2001 Noguchi ............... B41J 2/16526
347/23
10,137,684 B2 * 11/2018 Horade ................ B41J 2/17509

FOREIGN PATENT DOCUMENTS

JP 2003-300313 A 10/2003
JP 2005-343035 A 12/2005
JP 2011-098546 A 5/2011
(Continued)

*Primary Examiner* — Henok D Legesse
(74) *Attorney, Agent, or Firm* — Foley & Lardner LLP

(57) ABSTRACT

An inkjet printer for printing labels includes: a first interface configured to receive, from a host computer, print data for images to be printed on the labels; a second interface configured to receive, from a sequencer, a first signal indicating a timing to execute a printing operation that includes printing the images, and a second signal indicating a timing to execute a predetermined operation that cannot be executed in parallel with printing the images; and a controller configured to: render the print data received via the first interface, and execute the printing operation based on the rendered print data at a timing based on the first signal received via the second interface, and execute the predetermined operation at a timing based on the second signal received via the second interface.

18 Claims, 9 Drawing Sheets

(51) Int. Cl.
*B41J 2/165* (2006.01)
*G06F 3/12* (2006.01)

(56) References Cited

FOREIGN PATENT DOCUMENTS

| | | |
|---|---|---|
| JP | 2014-106817 A | 6/2014 |
| JP | 2014-172634 A | 9/2014 |

* cited by examiner

|  | F1 | F2 | F3 | F41 | F4 F42 |
|---|---|---|---|---|---|
| PIN NUMBER | SIGNAL | I/O | LOW | HIGH |
| 1 | NOZZLE CHECK OPERATION COMMAND SIGNAL | INPUT | — | ACTIVE-HIGH |
| 2 | CLEANING OPERATION COMMAND SIGNAL | INPUT | — | ACTIVE-HIGH |
| 3 | LABEL FEED COMMAND SIGNAL | INPUT | — | ACTIVE-HIGH |
| 4 | PRINTING OPERATION COMMAND SIGNAL | INPUT | — | ACTIVE-HIGH |
| 5 | GND | — | — | — |
| 6 | CANCEL COMMAND SIGNAL | INPUT | — | ACTIVE-HIGH |
| 7 | BACK-FEED COMMAND SIGNAL | INPUT | — | ACTIVE-HIGH |
| 8 | FIRST REPORT SIGNAL | OUTPUT | FIRST STATE | FIRST STATE INACTIVE |
| 9 | SECOND REPORT SIGNAL | OUTPUT | SECOND STATE | SECOND STATE INACTIVE |
| 10 | GND | — | — | — |
| 11 | PRINTING ENABLED/DISABLED SIGNAL | OUTPUT | PRINTING-ENABLED STATE INACTIVE | PRINTING-ENABLED STATE |
| 12 | RENDERED DATA BUFFERED SIGNAL | OUTPUT | DATA-BUFFERED STATE INACTIVE | DATA-BUFFERED STATE |
| 13 | PRINTING-IN-PROGRESS SIGNAL | OUTPUT | PRINTING STATE INACTIVE | PRINTING STATE |
| 14 | MAINTENANCE-IN-PROGRESS SIGNAL | OUTPUT | MAINTENANCE-IN-PROGRESS STATE INACTIVE | MAINTENANCE-IN-PROGRESS STATE |
| 15 | EJECTION ERROR DETECTION SIGNAL | OUTPUT | EJECTION ERROR STATE INACTIVE | EJECTION ERROR STATE |

FIG. 7

INKJET PRINTER, AND CONTROL METHOD OF AN INKJET PRINTER

CROSS-REFERENCE TO RELATED APPLICATION

The present application claims priority to Japanese Application No. 2016-129053, filed on Jun. 29, 2016, which is hereby incorporated by reference in its entirety.

BACKGROUND

The present disclosure relates to an inkjet printer and to a control method of an inkjet printer.

Methods of controlling production of labels at a specific timing to prevent labels from falling away or becoming distorted in a production line involving printing and issuing labels, and applying the printed labels to product are known from the literature. See, for example, JP-A-2014-172634.

SUMMARY

Labels may be printed with an inkjet printer. To prevent a drop in print quality, inkjet printers should perform specific operations using the inkjet head, such as cleaning the inkjet head. To print labels at the appropriate time with an inkjet printer, printing should be controlled with consideration for this inkjet printer operation.

The present disclosure is directed to this problem, and one objective of certain embodiments is to enable executing, at appropriate times, a printing operation that includes printing labels, and a specific operation other than the printing operation, based on characteristics of the inkjet printer.

According to one embodiment, an inkjet printer that prints labels includes: a first interface configured to communicate with a host computer that generates print data for images printed on the labels; a second interface configured to communicate with a sequencer that sends a first signal indicating the timing to execute a printing operation involving printing the print data; and a controller configured to render the print data received through the first interface, and execute a printing operation based on the rendered print data at a timing based on the first signal received through the second interface. The second interface receives a second signal indicating the timing to execute a specific operation that cannot execute parallel to printing the print data, and the controller executes the specific operation at a timing based on the second signal received through the second interface.

Because there are specific operations that cannot be executed at the same time as the printing operation, and these specific operations must also be executed, this configuration enables an inkjet printer to execute a printing operation that includes printing labels, and a specific operation different from the printing operation, at appropriate times based on a signal received from the sequencer.

In an inkjet printer according to another embodiment, the specific operation is a maintenance operation that includes ejecting ink from an inkjet head.

Because there are maintenance operations that cannot be executed at the same time as the printing operation, and these maintenance operations must also be executed, this configuration enables an inkjet printer to execute a printing operation that includes printing labels, and a maintenance operation different from the printing operation, at appropriate times based on a signal received from the sequencer.

In an inkjet printer according to another embodiment, maintenance operation includes a cleaning operation of the inkjet head; and the controller caps the inkjet head and suctions the inkjet head, as the cleaning operation.

Because there are cleaning operations that cannot be executed at the same time as the printing operation, and these cleaning operations must also be executed, this configuration enables an inkjet printer to execute a printing operation that includes printing labels, and a cleaning operation different from the printing operation, at appropriate times based on a signal received from the sequencer.

In an inkjet printer according to another embodiment, the maintenance operation includes a nozzle check operation of the inkjet head; and the controller ejects ink from the nozzles of the inkjet head and detects ejection problem as the nozzle check operation.

Because there are nozzle check operations that cannot be executed at the same time as the printing operation, and these nozzle check operations must also be executed, this configuration enables an inkjet printer to execute a printing operation that includes printing labels, and a nozzle check operation different from the printing operation, at appropriate times based on a signal received from the sequencer.

In an inkjet printer according to another embodiment, when a maintenance operation based on the second signal executes, the second interface sends to the sequencer a signal indicating that the maintenance operation is being executed.

This configuration enables the inkjet printer to inform the sequencer that the maintenance operation is being executed.

In an inkjet printer according to another embodiment, when a printing operation based on the first signal executes, the second interface sends to the sequencer a signal indicating that the printing operation is being executed.

This configuration enables the inkjet printer to inform the sequencer that the printing operation is being executed.

In another embodiment, a control method of an inkjet printer that prints labels includes: rendering the print data and executes the printing operation based on the rendered print data at a timing based on the first signal when a first signal indicating the timing to execute a printing operation involving printing print data is received from a host computer; and executing the specific operation at a timing based on the second signal when a second signal indicating the timing to execute a specific operation that cannot be executed parallel to printing print data is received from the host computer.

Because there are specific operations that cannot be executed at the same time as the printing operation, and these specific operations must also be executed, this configuration enables an inkjet printer to execute a printing operation involving printing labels, and a specific operation different from the printing operation, at appropriate times based on a signal received from the sequencer.

Other objects and attainments together with a fuller understanding of the invention will become apparent and appreciated by referring to the following description and claims taken in conjunction with the accompanying drawings.

BRIEF DESCRIPTION OF THE DRAWINGS

FIG. 7 describes I/O signals of the inkjet printer.

DESCRIPTION OF EMBODIMENTS

Embodiments of the present invention are described below with reference to the accompanying figures.

Figure 1:
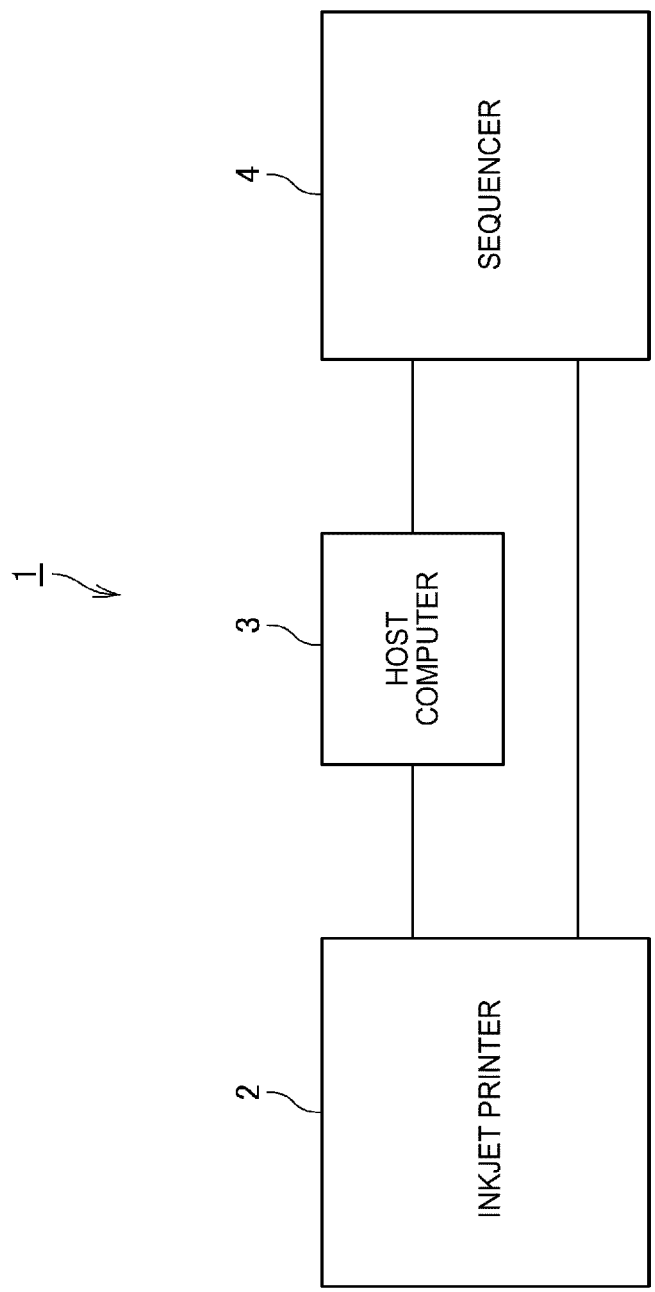
FIG. 1 illustrates a printing system according to this embodiment of the invention.

FIG. 1 shows the configuration of a printing system 1 according to one embodiment of the invention.

As shown in FIG. 1, the printing system 1 includes an inkjet printer 2, host computer 3, and sequencer 4. The inkjet printer 2 communicatively connects to the host computer 3 and sequencer 4. The host computer 3 communicatively connects to the sequencer 4.

The printing system 1 is a system in which an inkjet printer 2, as controlled by the host computer 3 and sequencer 4, prints images on labels R2 on roll paper R (see FIG. 2) held inside the case of the printer.

Figure 2:
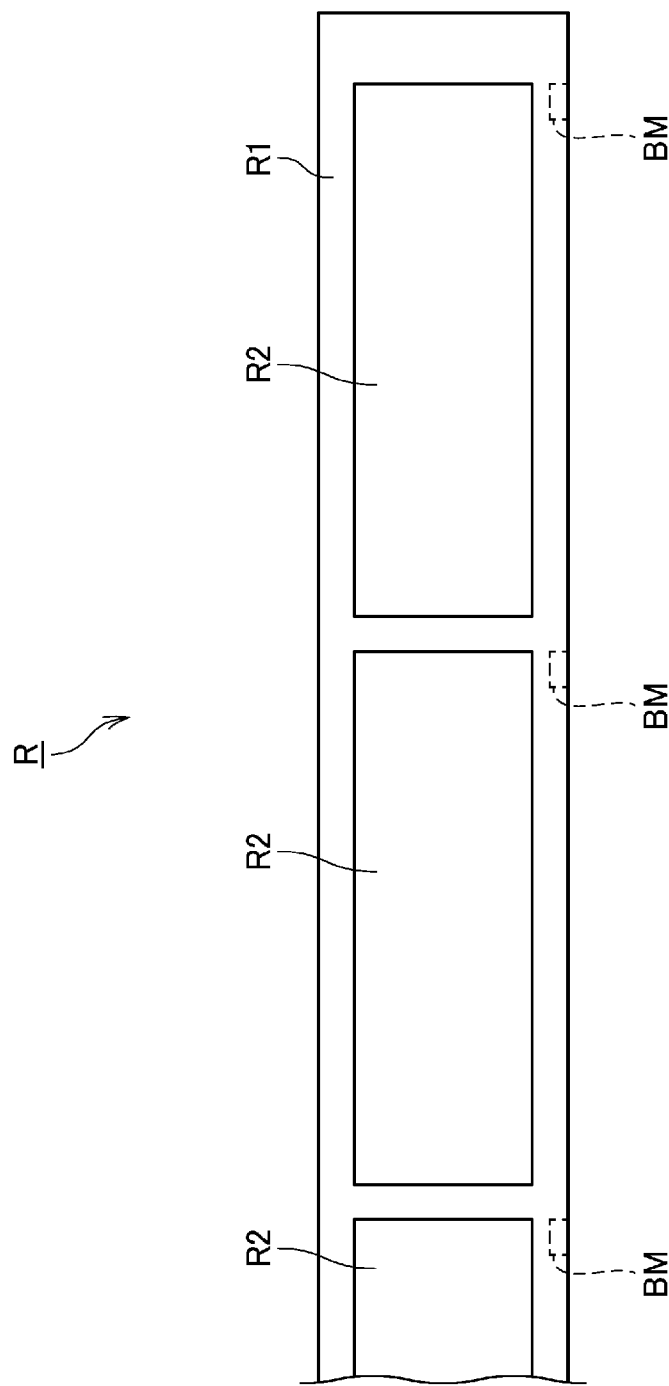
FIG. 2 shows an example of roll paper.

FIG. 2 illustrates the roll paper R held inside the inkjet printer 2.

As shown in FIG. 2, the roll paper R is label paper having multiple labels R2 affixed with a gap therebetween on continuous release paper R1 (backing paper). The back of the labels R2 is adhesive, and the labels R2 can be easily peeled from the release paper R1. The labels R2 have a constant length and width. The gap between adjacent labels R2 is also constant. The area of the roll paper R corresponding to each label R2 is the area where images are printed (dots are formed). The inkjet printer 2 forms dots on the labels R2 with an inkjet head 10 (FIG. 3) so that images are printed by groups of dots. As shown in FIG. 2, a black mark BM, which is a black indexing mark, is formed at a specific position relative to each label R2 on the back of the roll paper R.

A printing system 1 according to this embodiment is used as described below.

In one application, the printing system 1 is deployed in a factory that manufactures electronic products, and is used in the factory in the process that prints serial number images on the labels R2 and then applies the labels R2 to the electronic products. In this application, multiple manufactured electronic products are placed on a conveyor belt with a space therebetween and conveyed in a specific direction. The inkjet printer 2 is located near the conveyor belt. Disposed near the inkjet printer 2 is a dedicated controller that automatically peels the labels R2 on which a serial number was printed by the inkjet printer 2 from the release paper R1, and applies the labels R2 peeled from the release paper R1 to the electronic products at a specific position on the conveyor belt. This dedicated controller continuously repeats the operation of peeling the labels R2 on which a serial number was printed by the inkjet printer 2 from the release paper R1, and applying the peeled labels R2 at the specific position on the conveyor belt, so that the labels R2 are continuously applied to the multiple electronic products conveyed by the conveyor belt.

When the printing system 1 is deployed in such a factory, the timing when the inkjet printer 2 prints the labels R2 must be controlled appropriately so that labels R2 can be continuously applied to the electronic products without stopping conveyance of the electronic products by the conveyor belt.

Below, the process of printing images on one label R2 (including all processes ancillary to this process) is referred to as the "printing operation."

Figure 3:
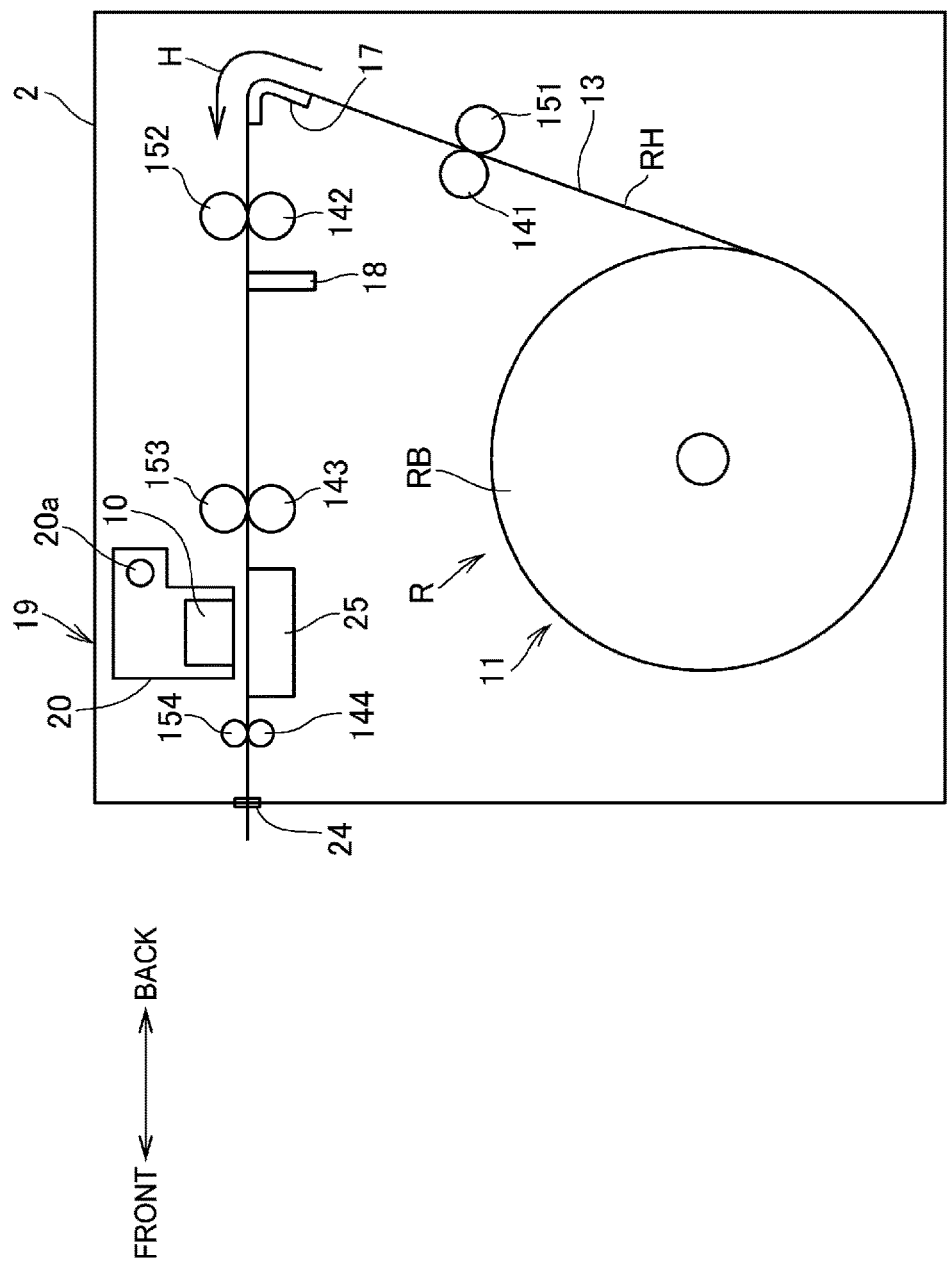
FIG. 3 illustrates the major configuration of an inkjet printer.

FIG. 3 illustrates the configuration of main parts of an inkjet printer 2 according to this embodiment.

When referring to FIG. 3 below, the directions to the front and back are as indicated by the arrows in FIG. 3.

The inkjet printer 2 is a serial inkjet printer that stores roll paper R, conveys the stored roll paper R in the conveyance direction H, and prints images by ejecting ink from a serial inkjet head 10 onto the roll paper R.

As shown in FIG. 3, the inkjet printer 2 has a roll paper compartment 11 that holds the roll paper R. Below, the portion of the roll paper R that is wound into a roll and stored in the roll paper compartment 11 is referred to as the paper roll RB. The portion of the roll paper R that is delivered and conveyed from the paper roll RB stored in the roll paper compartment 11 is referred to as the conveyed roll paper RH.

As shown in FIG. 3, a conveyance path 13, which is the path through which the conveyed roll paper RH is conveyed, is formed inside the inkjet printer 2. The conveyed roll paper RH delivered from the paper roll RB is conveyed in the conveyance direction H along the conveyance path 13.

As shown in FIG. 3, four conveyance rollers 141, 142, 143, 144 are disposed along the conveyance path 13 from the upstream side to the downstream side in the conveyance direction H. At a position opposite each of the conveyance rollers 141, 142, 143, 144 is disposed a driven roller 151, 152, 153, 154 that turns following rotation of the matching conveyance roller 141, 142, 143, 144. The conveyed roll paper RH is held between the conveyance rollers 141, 142, 143, 144 and driven roller 151, 152, 153, 154, and conveyed in the conveyance direction H by rotation of the conveyance rollers 141, 142, 143, 144.

As shown in FIG. 3, a guide member 17 is disposed downstream in the conveyance direction H from conveyance roller 141. The guide member 17 contacts the back of the conveyed roll paper RH, and causes the conveyed roll paper RH to curve from the upward conveyance path from the paper roll RB to the front. By contacting the conveyed roll paper RH and causing the conveyed roll paper RH to curve, the guide member 17 applies tension to the conveyed roll paper RH and suppresses the development of slack in the conveyed roll paper RH.

Downstream in the conveyance direction H from the guide member 17 is a black mark sensor 18. The black mark sensor 18 is a sensor that optically detects the black marks BM formed on the back of the roll paper R. When a black mark BM is at the detection position of the black mark sensor 18, the printer controller 30 (FIG. 4) detects that a black mark BM is at the detection position based on the output from the black mark sensor 18. The printer controller 30 manages the position of the roll paper R based on black mark BM detection.

Downstream in the conveyance direction H from the black mark sensor 18 is the print unit 19.

The print unit 19 includes a carriage 20, and the inkjet head 10 carried by the carriage 20.

The carriage 20 is supported by a carriage rail 20a extending in the main scanning direction crosswise to the conveyance direction H, and moves the inkjet head 10 bidirectionally in the main scanning direction along the carriage rail 20a.

The inkjet head 10 has multiple nozzle rows extending in the sub-scanning direction (the same direction as the conveyance direction H) perpendicular to the main scanning direction. In this embodiment, there are four nozzle rows, one each for color: cyan (C), yellow (Y), magenta (M), and black (K). The inkjet head 10 receives ink supplied from an ink cartridge not shown, and prints images by forming dots on the conveyed roll paper RH by ejecting ink from the appropriate nozzles in each nozzle row.

A platen 25 is disposed opposite the inkjet head 10. The conveyance path 13 passes between the inkjet head 10 and platen 25. The platen 25 extends across the range where dots can be formed by the inkjet head 10, and holds the conveyed roll paper RH flat so that the surface of the conveyed roll paper RH on the platen 25 is perpendicular to the direction in which ink is ejected from the inkjet head 10.

Downstream in the conveyance direction H from the print unit 19 is a paper exit 24. The conveyed roll paper RH is discharged through the paper exit 24 to the outside of the inkjet printer 2 case.

Figure 4:
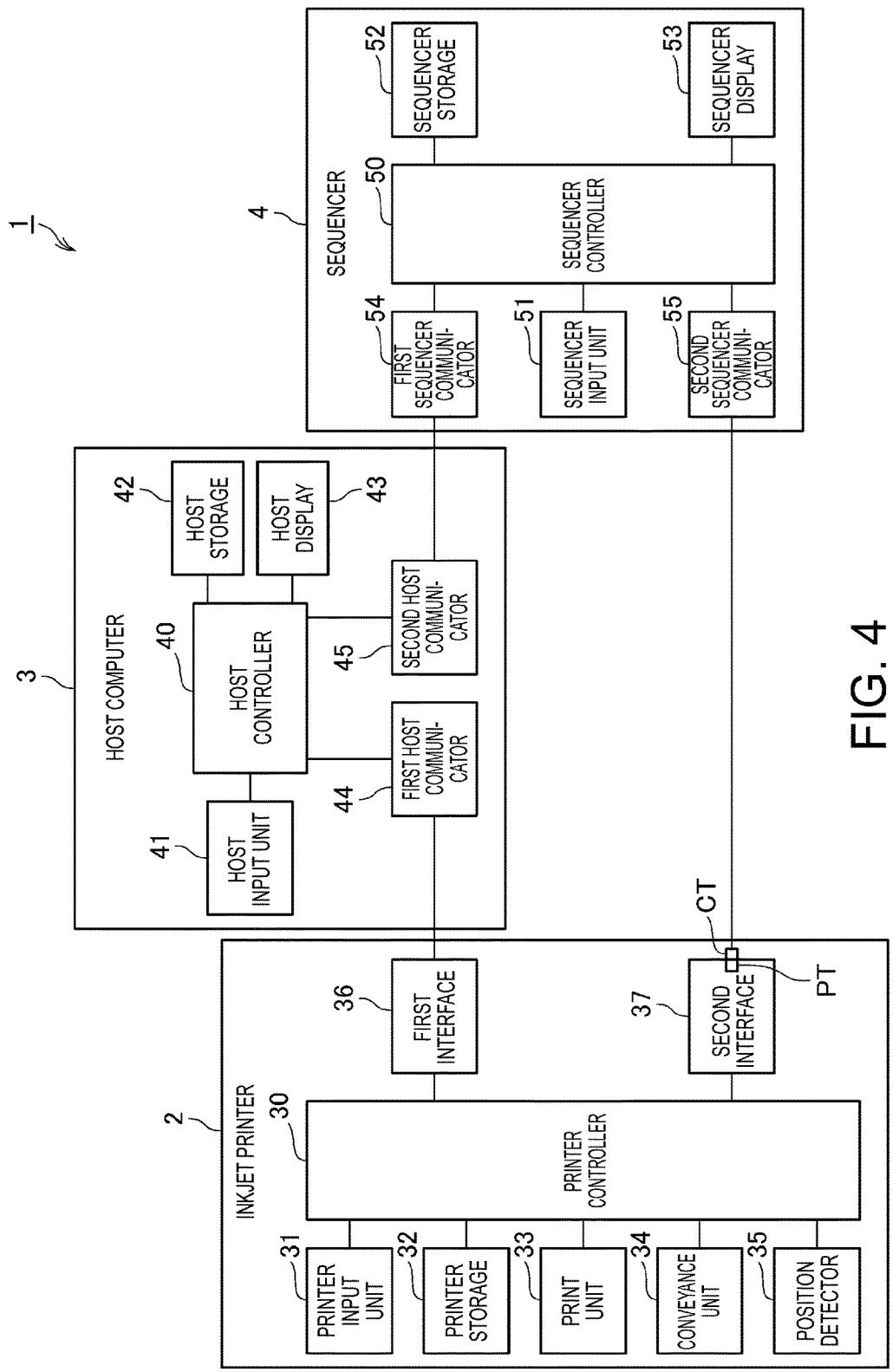
FIG. 4 is a block diagram illustrating the functional configuration of devices in the printing system.

FIG. 4 is a block diagram of the functional configuration of a printing system 1 according to this embodiment.

As shown in FIG. 4, the printing system 1 includes an inkjet printer 2, host computer 3, and sequencer 4.

The inkjet printer 2 is a serial inkjet printer that prints images by ejecting ink from a serial inkjet head 10.

As shown in FIG. 4, the inkjet printer 2 has a printer controller 30 (controller), printer input unit 31, printer storage 32, print unit 33, conveyance unit 34, position detector 35, first interface 36, and second interface 37.

The printer controller 30 includes a CPU, ROM, RAM, ASIC, signal processor, and other peripheral circuits not shown, and controls other parts of the inkjet printer 2. The printer controller 30 executes processes by the cooperation of hardware and software, such as a CPU reading a program from ROM into RAM and running the program, or functions embedded in the ASIC executing processes, or the signal processor executing processes by a signal process.

The printer input unit 31 has input means such as operating switches or a touch panel, detects input to the input means, and outputs to the printer controller 30. Based on input from the printer input unit 31, the printer controller 30 executes processes appropriate to the input to the input means.

The printer storage 32 includes nonvolatile memory, and stores information.

The print unit 33 includes the inkjet head 10; a head driver circuit that drives the inkjet head 10; the carriage 20; a carriage motor that moves the carriage 20 through a power transfer mechanism; a motor drive circuit that drives the carriage motor; and other components related to printing, and prints images on the labels R2 as controlled by the printer controller 30.

The conveyance unit 34 includes the conveyance rollers 141, 142, 143, 144; a conveyance motor that turns the conveyance rollers 141, 142, 143, 144; a motor drive circuit that drives the conveyance motor; and other components related to roll paper R conveyance, and conveys the roll paper R in the conveyance direction H or the reverse of the conveyance direction H as controlled by the printer controller 30.

The position detector 35 includes the black mark sensor 18, and outputs the detection value of the black mark sensor 18 to the printer controller 30. Based on input from the position detector 35, the printer controller 30 detects that one black mark BM is located at the position corresponding to the black mark sensor 18, and manages the position on the conveyance path 13 of the one label R2 corresponding to the one black mark BM.

The first interface 36 includes an interface board with a USB-compatible port and other components related to communication using the USB standard, and communicates according to the appropriate USB standard as controlled by the printer controller 30. The host computer 3 connects through a USB cable to the first interface 36.

Note that the communication protocol used for communication between the inkjet printer 2 and host computer 3 is not limited to USB, and may be by another desirable standard, including a non-USB serial communication standard (such as RS-232C), a parallel communication standard (such as IEEE 1284), a wired LAN standard (such as Ethernet), a wireless LAN standard (such as Wi-Fi), or a near-field communication standard (such as Bluetooth®).

The second interface 37 includes a dedicated port PT (described further below) to which the dedicated connector CT of a dedicated cable KB connects, and communicates with the sequencer 4 as controlled by the printer controller 30. Communication between the inkjet printer 2 and sequencer 4 is described further below.

The host computer 3 is a host computer that controls the inkjet printer 2.

As shown in FIG. 4, the host computer 3 includes a host controller 40, host input unit 41, host storage 42, host display 43, first host communicator 44, and a second host communicator 45.

The host controller 40 includes a CPU, ROM, RAM, ASIC, signal processor, and other peripheral circuits not shown, and controls other parts of the host computer 3. The host controller 40 executes processes by the cooperation of hardware and software, such as the CPU reading a program from ROM into RAM and running the program, or functions embedded in the ASIC executing processes, or the signal processor executing processes by a signal process.

The host input unit 41 detects input to input means such as input devices or operating switches, and outputs to the host controller 40.

The host storage 42 includes nonvolatile memory, and stores information.

The host display 43 is a display means such as an LCD panel, and displays information on the display means as controlled by the host controller 40.

The first host communicator 44 communicates by USB with the inkjet printer 2 as controlled by the host controller 40.

The second host communicator 45 communicates by USB with the sequencer 4 as controlled by the host controller 40. The communication standard used for communication between the host computer 3 and sequencer 4 is not limited to USB, and a suitable standard may be used.

The sequencer 4 is a computer that controls the inkjet printer 2 and host computer 3.

As shown in FIG. 4, the sequencer 4 includes a sequencer controller 50, sequencer input unit 51, sequencer storage 52, sequencer display 53, first sequencer communicator 54, and a second sequencer communicator 55.

The sequencer controller 50 includes a CPU, ROM, RAM, ASIC, signal processor, and other peripheral circuits not shown, and controls parts of the inkjet printer 2. The sequencer controller 50 executes processes by the cooperation of hardware and software, such as the CPU reading a program from ROM into RAM and running the program, or functions embedded in the ASIC executing processes, or the signal processor executing processes by a signal process.

The sequencer input unit 51 detects input to input means such as input devices or operating switches, and outputs to the sequencer controller 50.

The sequencer storage 52 includes nonvolatile memory, and stores information.

The sequencer display 53 is a display means such as an LCD panel, and displays information on the display means as controlled by the sequencer controller 50.

The first sequencer communicator 54 communicates by USB with the inkjet printer 2 as controlled by the sequencer controller 50.

The second sequencer communicator 55 communicates with the inkjet printer 2 as controlled by the sequencer controller 50.

Maintenance operations that can be executed by the inkjet printer 2 are described next.

A maintenance operation is a process executed to prevent deterioration of print quality. The maintenance operation is a process executed in conjunction with ejecting ink from the inkjet head 10, and cannot be executed in parallel (simultaneously) to the printing operation involving printing images on labels R2.

Maintenance operations of the inkjet printer 2 according to this embodiment include a cleaning operation and a nozzle check operation. The cleaning operation and nozzle check operation are described below.

Cleaning Operation

Figure 5:
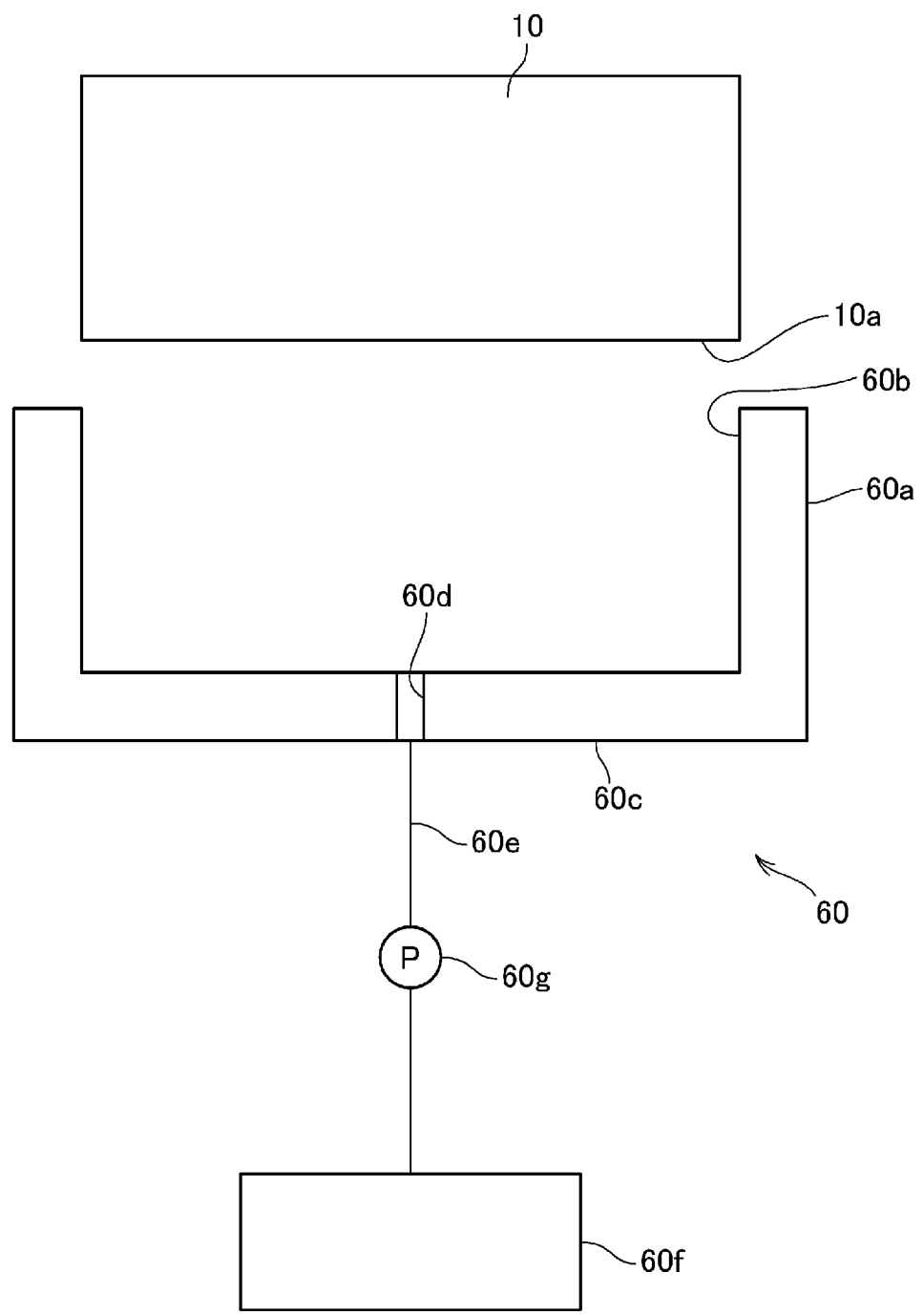
FIG. 5 illustrates the configuration of a main part of the inkjet printer.

FIG. 5 schematically illustrates the inkjet head 10 and main parts at the home position HP.

The home position HP is a position at one end of the range of carriage 20 movement.

As shown in FIG. 5, the nozzle face 10a is on the bottom of the inkjet head 10. The nozzle face 10a has a nozzle row for each color: cyan (C), yellow (Y), magenta (M), and black (K).

As shown in FIG. 5, a capping device 60 is disposed below the inkjet head 10 at the home position HP.

The capping device 60 includes a cap 60a. The cap 60a is a box-like member that is open at the top, and has an internal inkjet head storage space 60b in which the nozzle face 10a of the inkjet head 10 can be stored. The cap 60a can move vertically as driven by a specific motor that is driven as controlled by the printer controller 30. When the cap 60a rises, the cap 60a stores the nozzle face 10a of the inkjet head 10 set to the home position HP in the inkjet head storage space 60b. More specifically, the shape of the perimeter of the inkjet head storage space 60b of the cap 60a conforms to the shape of the outside of the inkjet head 10. When the cap 60a rises to a specific position, the nozzle face 10a is housed inside the inkjet head storage space 60b with the outside circumference of the inkjet head 10 touching the perimeter of the inkjet head storage space 60b. Below, storing the nozzle face 10a in the inkjet head storage space 60b is referred to as capping the inkjet head 10.

A drain hole 60d passing through the bottom 60c is formed in the bottom 60c of the cap 60a. A tube 60e is connected to the drain hole 60d. A waste ink tank 60f for storing waste ink is connected to the tube 60e. A pump 60g that suctions and discharges waste ink through the drain hole 60d is connected to the tube 60e. The pump 60g operates as driven by a specific motor controlled by the printer controller 30.

The viscosity of ink remaining in nozzle cavities of the inkjet head 10 increases over time, and this increased viscosity can create problems ejecting ink. To prevent this, the cleaning operation is an operation that forcibly suctions ink from the nozzle cavities.

The printer controller 30 executes the cleaning operation using the capping device 60. More specifically, in the cleaning operation, the printer controller 30 moves the inkjet head 10 to the home position HP. Next, the printer controller 30 raises the cap 60a to cap the inkjet head 10. The printer controller 30 then drives the pump 60g. When the pump 60g is driven, air is suctioned from the drain hole 60d, producing negative pressure on the nozzle face 10a, and ink remaining in the nozzle cavities is forcibly suctioned from the nozzles and collected as waste ink in the waste ink tank 60f.

Nozzle Check Operation

The nozzle check operation is a process of detecting whether or not an ink ejection problem has developed in the nozzles of the inkjet head 10. Ink ejection problems can be caused by increased viscosity in the ink in the nozzle cavities, air bubbles trapped in the cavities, and foreign matter sticking to the nozzle face.

The printer controller 30 executes the nozzle check operation as described below. Inside the nozzle cavity are a vibrator that causes the volume of the cavity to change and ink inside the cavity to be ejected from the nozzle, and an actuator that causes the vibrator to vibrate. The printer controller 30 has the ability to detect residual vibration in the vibrator when ink is ejected from the nozzle as a waveform.

During the nozzle check operation, the printer controller 30 sequentially ejects a specific amount of ink from each nozzle. When the specific amount of ink is ejected from one nozzle, the printer controller 30 detects the waveform of the residual vibration in the vibrator. Next, the printer controller 30 analyzes the detected waveform, quantifies the period and amplitude of the waveform, measures a specific vibration period in the waveform, and determines if an ejection problem has occurred in each nozzle by comparing the specific vibration period that was measured with a reference waveform (the standard waveform detected when there an ejection problem has not occurred, i.e., when ink is ejected normally).

Note that the method of the nozzle check operation is not limited to the foregoing, and any desirable method may be used. For example, the printer controller 30 may eject ink that has been charged by a specific method onto a conductive member. The printer controller 30 then detects change in the current flowing through the conductive member when the ink lands on the conductive member, and based on the detected change in current, determines whether or not there is an ejection problem.

Communication between the inkjet printer 2 and sequencer 4 is described next.

As described above, the second interface 37 of the inkjet printer 2 has a dedicated port PT. This dedicated port PT is a port compatible with a serial communication standard, and has fifteen terminal pins P in a specific arrangement.

Figure 6:
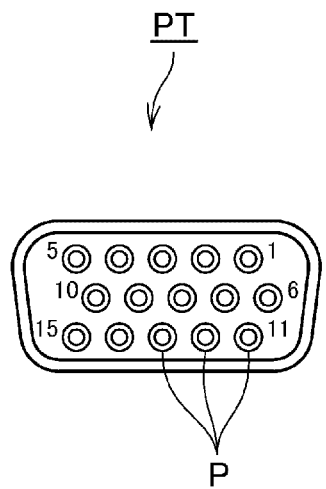
FIG. 6 is a pin map of a dedicated port.

FIG. 6 illustrates the arrangement of the pins P in the dedicated port PT.

As shown in FIG. 6, fifteen pins P labelled pin 1 to pin 15 are arrayed in a specific arrangement in the dedicated port PT. The content of signals input or output through the corresponding signal line is predefined.

FIG. 7 is a table describing, for each pin P in the dedicated port PT, the content of signals input to the inkjet printer 2 or output from the inkjet printer 2 through the signal line corresponding to that pin P.

The table in FIG. 7 has a record for each pin P. Each record has four fields, field F1 to field F4.

Field F1 contains the pin number of the pin P.

Field F2 contains the name assigned to the signal that is input or output through the signal line connected to the that pin P.

Field F3 shows whether that pin P is used for input to the inkjet printer 2, or used for output from the inkjet printer 2. Below, a pin P that is used for input to the inkjet printer 2 is referred to as an input pin, and a pin P that is used for output from the inkjet printer 2 is referred to as an output pin.

Field F4 shows the state of signals passing through the input pins, and for output pins shows the relationship between the signal content and the signal state. Field F4 includes a field F41 related to signals with a LOW voltage level, and a field F42 related to signals with a HIGH voltage level.

In this example, for input to the inkjet printer 2, signals with a HIGH voltage level are input from the sequencer 4 to the inkjet printer 2 as a single pulse signal. As a result, an input pin identified as active-high in field F42 means that the signal is input from the sequencer 4 by inputting a HIGH pulse.

For output from the inkjet printer 2, the inkjet printer 2 outputs different signals by changing the voltage level of the voltage applied to the signal line corresponding to that pin P. As a result, for output pins, field F41 shows the content of the signal when the voltage level of the voltage applied to the signal line corresponding to that pin P is LOW; and field F42 shows the content of the signal when the voltage level of the voltage applied to the signal line corresponding to that pin P is HIGH.

As shown in the table in FIG. 7, the pin P of pin number 1 is an input pin to which a nozzle check operation command signal is input. The nozzle check operation command signal is a signal instructing executing the nozzle check operation. When the nozzle check operation command signal is input from the sequencer 4, the printer controller 30 starts the nozzle check operation based on the signal input.

The nozzle check operation command signal is an example of a specific operation command signal (second signal).

As shown in the table in FIG. 7, the pin P of pin number 2 is an input pin to which a cleaning operation command signal is input. The cleaning operation command signal is a signal instructing executing the cleaning operation. When the cleaning operation command signal is input from the sequencer 4, the printer controller 30 starts the cleaning operation based on the signal input.

The cleaning operation command signal is another example of a specific operation command signal (second signal).

As shown in the table in FIG. 7, the pin P of pin number 3 is an input pin to which a label feed command signal is input. The label feed command signal is a signal instructing conveying the roll paper R a specific distance in the conveyance direction H. When the label feed command signal is input from the sequencer 4, the printer controller 30 controls the conveyance unit 34 based on the input signal to convey the label R2 a specific distance in the conveyance direction H.

As shown in the table in FIG. 7, the pin P of pin number 4 is an input pin to which a printing operation command signal is input. The printing operation command signal is a signal instructing printing an image on a label R2. When the printing operation command signal is input from the sequencer 4, the printer controller 30 controls the print unit 33 and conveyance unit 34 based on the input signal to execute the printing operation, including printing an image on a label R2.

The process executed by the printer controller 30 based on input of the printing operation command signal is described further below.

As shown in the table in FIG. 7, the pin P of pin number 5 is the ground terminal.

As shown in the table in FIG. 7, the pin P of pin number 6 is an input pin to which a cancel command signal is input. The cancel command signal is a signal instructing cancelling printing an image on a label R2. When the cancel command signal is input from the sequencer 4, the printer controller 30, based on the input signal, cancels printing an image on the label R2.

As shown in the table in FIG. 7, the pin P of pin number 7 is an input pin to which a back-feed command signal is input. The back-feed command signal is a signal instructing conveying the roll paper R a specific distance in the reverse of the conveyance direction H. When the back-feed command signal is input from the sequencer 4, the printer controller 30, based on the input signal, controls the conveyance unit 34 to convey the roll paper R a specific distance in the opposite direction as the conveyance direction H.

As shown in the table in FIG. 7, the pin P of pin number 8 is an output pin from which a first report signal is output. The first report signal is a signal reporting that the inkjet printer 2 is in a first state, or is not in the first state. The first state means, for example, that the remaining ink level is below a specific level, the remaining roll paper R is less than a specific amount, or the temperature of the inkjet head 10 is above a specific threshold. More specifically, the first state is a state in which the inkjet printer 2 can execute the printing operation, but an error may occur in the inkjet printer 2. When the inkjet printer 2 is in the first state, the printer controller 30 sets the voltage level of the signal line corresponding to pin 8 LOW. When the inkjet printer 2 is not in the first state, the printer controller 30 sets the voltage level of the signal line corresponding to pin 8 HIGH.

Note that while not shown in the figures, the inkjet printer 2 has sensors appropriately disposed to determine whether the inkjet printer 2 is in the first state or a second state (described below).

As shown in the table in FIG. 7, the pin P of pin number 9 is an output pin from which a second report signal is output. The second report signal is a signal reporting that the inkjet printer 2 is in a second state, or is not in the second state. The second state means, for example, that there is no ink (the ink has run out), there is no paper, or a paper jam has occurred. More specifically, the second state is a state in which an error has occurred in the inkjet printer 2, and the printing operation cannot be executed normally. When the inkjet printer 2 is in the second state, the printer controller 30 sets the voltage level of the signal line corresponding to pin 9 LOW. When the inkjet printer 2 is not in the second state, the printer controller 30 sets the voltage level of the signal line corresponding to pin 9 HIGH.

As shown in the table in FIG. 7, the pin P of pin number 10 is a ground terminal.

As shown in the table in FIG. 7, the pin P of pin number 11 is an output pin from which a printing enabled/disabled signal is output. The printing enabled/disabled signal is a signal reporting that the inkjet printer 2 can execute the printing operation immediately upon receiving a printing operation command signal (referred to below as a printing-enabled state), or reporting that the inkjet printer 2 is not in the printing-enabled state. When the inkjet printer 2 is not in the printing-enabled state, the printer controller 30 sets the voltage level of the signal line corresponding to pin 11 LOW. When the inkjet printer 2 is in the printing-enabled state, the printer controller 30 sets the voltage level of the signal line corresponding to pin 11 HIGH.

As shown in the table in FIG. 7, the pin P of pin number 12 is an output pin from which a rendered data buffered signal is output. The rendered data buffered signal is a signal reporting that print data has been rendered in the image buffer (referred to below as a data-buffered state), or that print data is not in the image buffer. The process of rendering print data (image data based on the print data) in the image buffer is described further below. When the inkjet printer 2 is not in the data-buffered state, the printer controller 30 sets the voltage level of the signal line corresponding to pin 12 LOW. When the inkjet printer 2 is in the data-buffered state, the printer controller 30 sets the voltage level of the signal line corresponding to pin 12 HIGH.

As shown in the table in FIG. 7, the pin P of pin number 13 is an output pin from which a printing-in-progress signal is output. The printing-in-progress signal is a signal reporting that the inkjet printer 2 is executing the printing operation printing images based on the print data rendered in the image buffer (referred to below as the printing state), or is not in the printing state. When the inkjet printer 2 is not in the printing state, the printer controller 30 sets the voltage level of the signal line corresponding to pin 13 LOW. When the inkjet printer 2 is in the printing state, the printer controller 30 sets the voltage level of the signal line corresponding to pin 13 HIGH.

As shown in the table in FIG. 7, the pin P of pin number 14 is an output pin from which a maintenance-in-progress signal is output. The maintenance-in-progress signal is a signal reporting that the maintenance operation described above (cleaning operation or nozzle check operation) is executing (referred to below as a maintenance-in-progress state), or is not in the maintenance-in-progress state. When the inkjet printer 2 is not in the maintenance-in-progress state, the printer controller 30 sets the voltage level of the signal line corresponding to pin 14 LOW. When the inkjet printer 2 is in the maintenance-in-progress state, the printer controller 30 sets the voltage level of the signal line corresponding to pin 14 HIGH.

As shown in the table in FIG. 7, the pin P of pin number 15 is an output pin from which an ejection error detection signal is output. The ejection error detection signal is a signal indicating that the nozzle check operation detected an ink ejection problem in more than a specific number of nozzles, and the ejection problem was not resolved (referred to below as an ejection error state); or the inkjet printer 2 is not in this ejection error state. When the inkjet printer 2 is not in the ejection error state, the printer controller 30 sets the voltage level of the signal line corresponding to pin 15 LOW. When the inkjet printer 2 is in the ejection error state, the printer controller 30 sets the voltage level of the signal line corresponding to pin 15 HIGH.

In this way, the sequencer 4 according to this embodiment can output a nozzle check operation command signal to the inkjet printer 2 to cause the inkjet printer 2 to execute the nozzle check operation when the signal is input to the inkjet printer 2.

The sequencer 4 can also output the cleaning operation command signal to the inkjet printer 2 to cause the inkjet printer 2 to execute the cleaning operation when the signal is input to the inkjet printer 2.

The sequencer 4 can also output the printing operation command signal to the inkjet printer 2 to cause the inkjet printer 2 to execute the printing operation when the signal is input to the inkjet printer 2.

The sequencer 4 can therefore control the inkjet printer 2 to execute the cleaning operation, nozzle check operation, and printing operation at the desired times.

The effect of this configuration is described below.

More specifically, to prevent a loss of print quality, the maintenance operation (cleaning operation, nozzle check operation) must execute at specific times. However, because the maintenance operation is a process involving ejecting ink from the inkjet head 10, it cannot be done at the same time as the printing operation. As a result, the configuration described above enables the sequencer 4 to control the inkjet printer 2 to execute the cleaning operation, nozzle check operation, and printing operation at appropriate times according to a plan.

For example, when the printing system 1 is deployed in a factory as described above, the timing when the inkjet printer 2 executes the cleaning operation, nozzle check operation, and printing operations is precisely controlled by the sequencer 4.

More specifically, while the multiple electronic products are conveyed by conveyor belt, the printing operation (printing images on labels R2) must proceed continuously with the timing of the printing operation synchronized by the dedicated controller to the timing when the label R2 is peeled. This is to enable applying the labels R2 continuously to the multiple electronic products without stopping the conveyor belt.

The inkjet printer 2 must also be controlled to not execute a maintenance operation during this time. This is because the start of the next printing operation will be delayed if a maintenance operation is executed after one printing operation ends and before the next printing operation starts during this label printing and peeling operation, and the printing operation may therefore not be able to execute at the time synchronized by the dedicated controller to the timing when the label R2 is peeled.

The configuration described above also enables executing the printing operation at a time synchronized by the dedicated controller to the timing when the label R2 is peeled, and not executing the maintenance operation, during the time electronic products are conveyed by the conveyor belt.

To suppress a drop in print quality, the maintenance operation must also execute while electronic products are not being conveyed by the conveyor belt. With the configuration described above, the sequencer 4 can control the inkjet printer 2 to execute the maintenance operation during times when electronic products are not being carried on the conveyor belt. For example, the sequencer 4 can communicate with the dedicated controller that controls the conveyor belt, regularly stop operation of the conveyor belt, and instruct the inkjet printer 2 to execute the maintenance operation while the conveyor belt is stopped.

Operation of the inkjet printer 2, host computer 3, and sequencer 4 is described next. The operation of devices in the printing system 1 is described below when the inkjet printer 2 executes, in conjunction with the sequencer 4, a maintenance-related process (described below), and then at a 10-second interval prints images on labels R2 (executes the printing operation) ten times.

Figure 8:
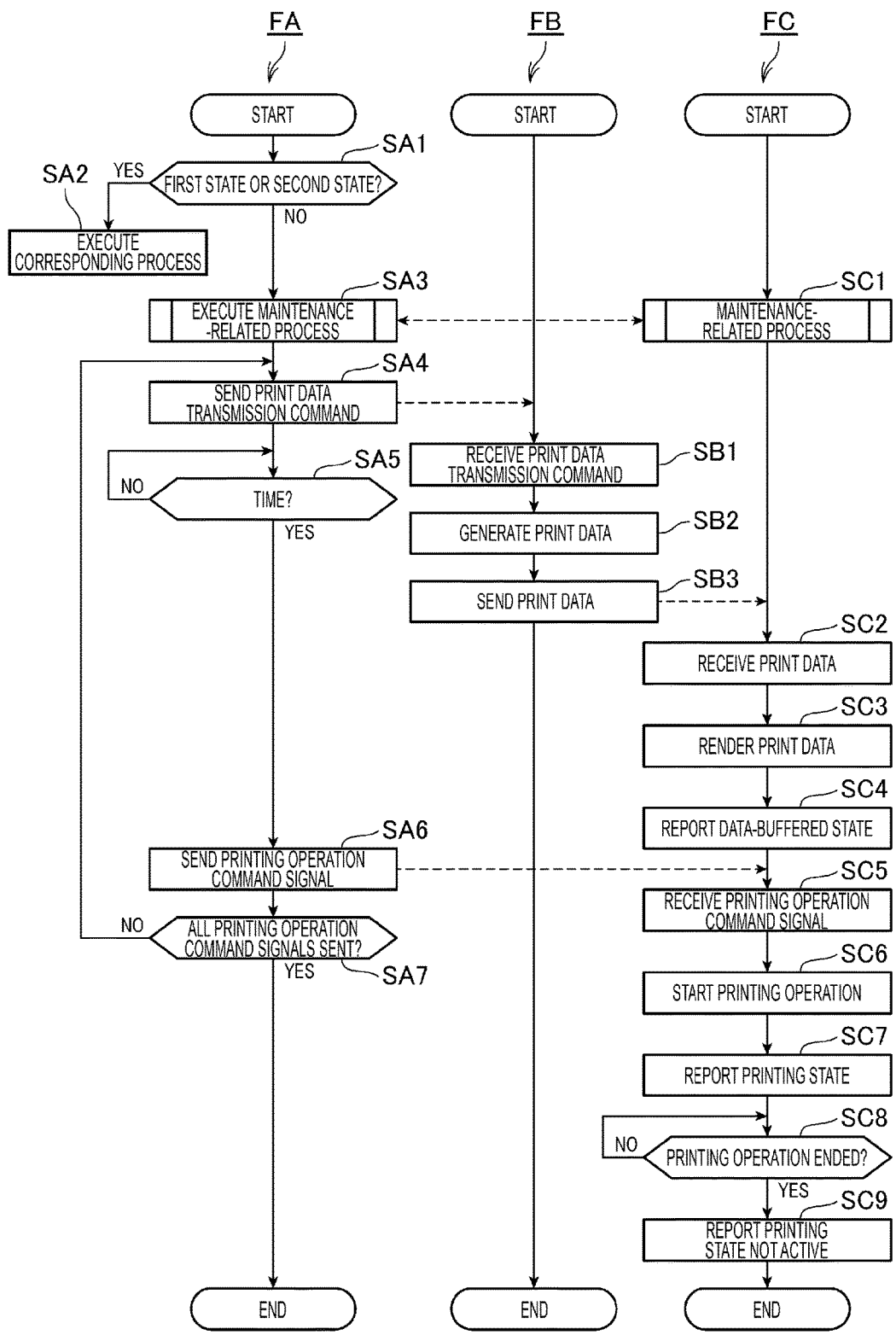
FIG. 8 is a flow chart of the operation of devices in the printing system.

FIG. 8 is a flow chart of the operation of devices in the printing system 1. In FIG. 8, flow chart FA is a flow chart of the operation of the sequencer 4, flow chart FB is a flow chart of the operation of the host computer 3, and flow chart FC is a flow chart of the operation of the inkjet printer 2.

Referring to flow chart FA, the sequencer controller 50 of the sequencer 4, based on the first report signal and second report signal input from the inkjet printer 2, determines if the inkjet printer 2 is in the first state or second state (step SA1).

If the inkjet printer 2 is in the first state or second state (step SA1: YES), the sequencer controller 50 executes an corresponding process (step SA2). The process executed in step SA2 may include, for example, the sequencer controller 50 controlling the sequencer display 53 to display on the display means information indicating that the inkjet printer 2 is in the first state or second state, thereby informing the user. As a result, the user knows that the inkjet printer 2 is in the first state or second state, and based on this knowledge can take appropriate measures to resolve the error, for example.

If the inkjet printer 2 is not in the first state or second state (step SA1: NO), the sequencer controller 50, and the printer controller 30 of the inkjet printer 2, cooperate to execute a maintenance-related process (step SA3, step SC1).

Figure 9:
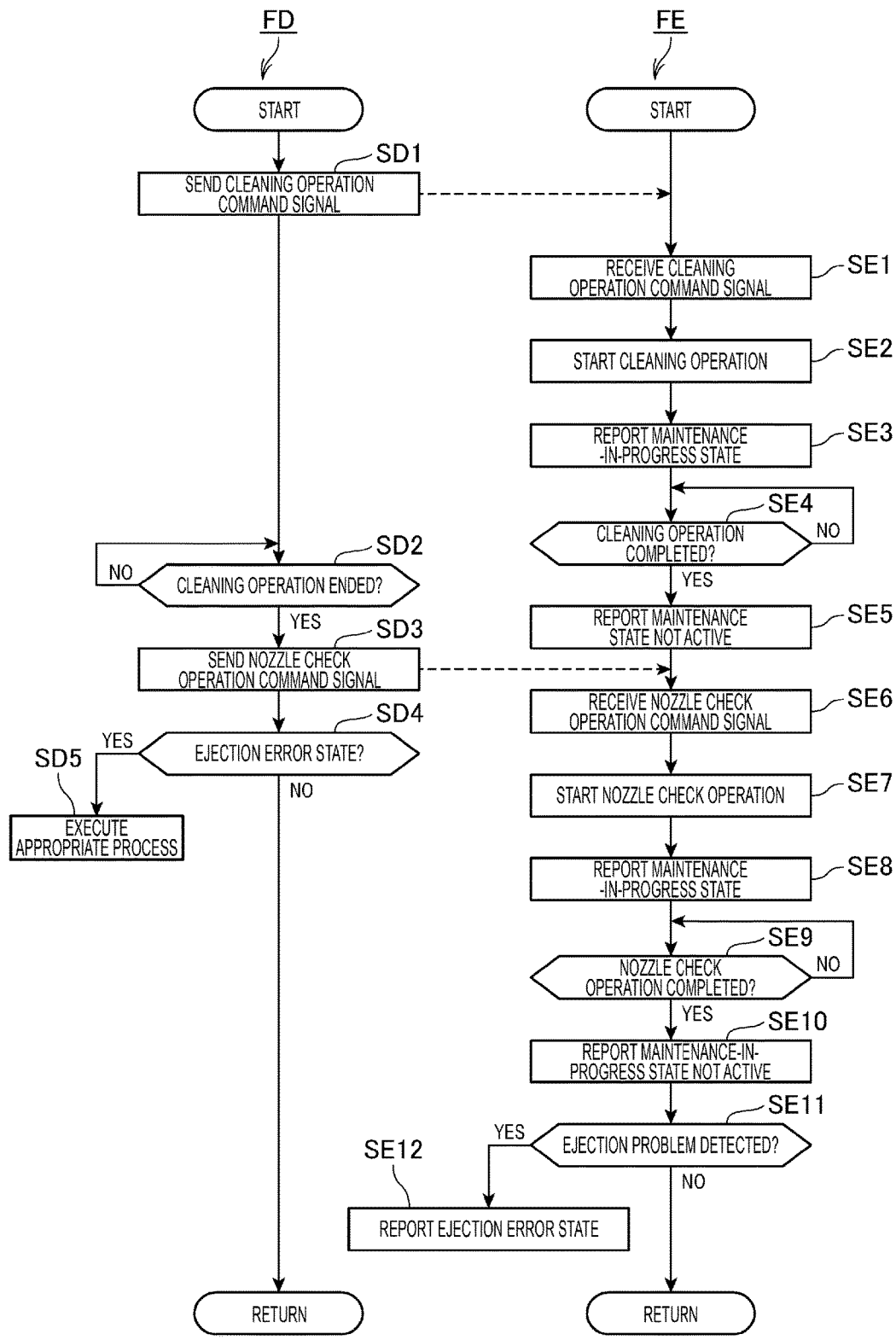
FIG. 9 is a flow chart of the operation of a sequencer and inkjet printer.

FIG. 9 is a flow chart of the operation of the sequencer 4 and inkjet printer 2 during the maintenance-related process. In FIG. 9, flow chart FD shows the operation of the sequencer 4, and flow chart FE shows the operation of the inkjet printer 2.

As shown in flow chart FD, the sequencer controller 50 of the sequencer 4 controls the second sequencer communicator 55 to send the cleaning operation command signal to the inkjet printer 2 (step SD1).

As shown in flow chart FE, the printer controller 30 of the inkjet printer 2 controls the second interface 37 to receive the cleaning operation command signal (step SE1).

Next, the printer controller 30, based on the received cleaning operation command signal, starts the cleaning operation (step SE2).

When the cleaning operation starts, the printer controller 30 changes the voltage level of the maintenance-in-progress signal output to the sequencer 4 to report the maintenance-in-progress state (step SE3).

Next, the printer controller 30 monitors whether or not the cleaning operation has ended (step SE4).

If the cleaning operation has ended (step SE4: YES), the printer controller 30 changes the voltage level of the maintenance-in-progress signal output to the sequencer 4 to report the maintenance-in-progress state is not active (step SE5).

As shown in flow chart FD, after sending the cleaning operation command signal, the sequencer controller 50, based on the change in the voltage level of the maintenance-in-progress signal, monitors whether or not the cleaning operation of the inkjet printer 2 ended (step SD2).

If the cleaning operation of the inkjet printer 2 ended (step SD2: YES), the sequencer controller 50 controls the second sequencer communicator 55 to send the nozzle check operation command signal to the inkjet printer 2 (step SD3).

As shown in flow chart FE, the printer controller 30 controls the second interface 37 to receive the nozzle check operation command signal (step SE6).

Next, the printer controller 30, based on reception of the nozzle check operation command signal, starts the nozzle check operation timed to reception of the nozzle check operation command signal (step SE7).

When the nozzle check operation starts, the printer controller 30 changes the voltage level of the maintenance-in-progress signal output to the sequencer 4 to report the maintenance-in-progress state (step SE8).

Next, the printer controller 30 monitors whether or not the nozzle check operation has ended (step SE9).

If the nozzle check operation has ended (step SE9: YES), the printer controller 30 changes the voltage level of the maintenance-in-progress signal output to the sequencer 4 to report the maintenance-in-progress state is not active (step SE10).

Next, the printer controller 30 determines if the nozzle check operation detected an ejection problem in more than a specific number of nozzles (step SE11).

If an ejection problem was not detected in more than the specific number of nozzles (step SE10: NO), the printer controller 30 ends the maintenance-related process.

If an ejection problem was detected in more than the specific number of nozzles (step SE11: YES), the printer controller 30 changes the voltage level of the ejection error detection signal to report an ejection error state (step SE12).

As shown in flow chart FD, after sending the nozzle check operation command signal, the sequencer controller 50, based on the change in the ejection error detection signal, determines if the inkjet printer 2 is in an ejection error state (step SD4).

If the inkjet printer 2 is not in an ejection error state (step SD4: NO), the sequencer controller 50 ends the maintenance-related process.

If the inkjet printer 2 is in the ejection error state (step SD4: YES), the sequencer controller 50 executes an appropriate process (step SD5).

In step SD5, the sequencer controller 50 may, for example, send the cleaning operation command signal and nozzle check operation command signal, and instruct the inkjet printer 2 to repeat the cleaning operation and nozzle check operation a specific number of times or less. If the inkjet printer 2 escapes the ejection error state by the cleaning operation executing this specific number of times or less, the sequencer controller 50 ends the maintenance-related process. If the inkjet printer 2 remains in the ejection error state even though the cleaning operation executes this specific number of times, the sequencer controller 50 controls the sequencer display 53 to display on the display means that the inkjet printer 2 is in the ejection error state, thereby informing the user.

As shown in flow chart FA in FIG. 8, after executing the maintenance-related process, the sequencer controller 50 controls the first sequencer communicator 54 to send a print data transmission command to the host computer 3 (step SA4).

The print data transmission command is a command instructing the host computer 3 to send print data (described below) to the inkjet printer 2.

As shown in flow chart FB, the host controller 40 of the host computer 3 controls the second host communicator 45 to receive the print data transmission command (step SB1).

Next, the host controller 40 generates print data (step SB2).

The print data is image data of an image to print on one label R2. The image data may be bitmap data or other type of data storing color values for each dot in a dot matrix pattern.

Information required to generate the print data is previously stored in the host computer 3 for each image to print on the labels R2. In step SB2, the host controller 40 acquires information corresponding to the image to print on a label R2, and generates the print data based on the acquired information.

Next, the host controller 40 controls the first host communicator 44, and sends the print data generated in step SB2 to the inkjet printer 2 (step SB3).

As shown in flow chart FC, the printer controller 30 of the inkjet printer 2 controls the first interface 36 to receive the print data (step SC2).

Next, the printer controller 30 references a lookup table, converts the received print data to image data, and renders the image data in the image buffer (step SC3). The image data is information identifying the amount of ink of each color to place at each dot of a dot matrix pattern. The process of step SC3 is an example of a process rendering print data.

Next, the printer controller 30 changes the voltage level of the rendered data buffered signal output to the sequencer 4 to indicate the data-buffered state (step SC4).

As shown in flow chart FA, after receiving the print data transmission command, the sequencer controller 50 monitors if it is time to send the printing operation command signal to the inkjet printer 2 (step SA5).

In this example, the printing operation of the inkjet printer 2 is executed every 10 seconds. Based thereon, if the printing operation command signal has still not been sent, in step SA5 the sequencer controller 50 immediately determines if the time to send the printing operation command signal has come. If the printing operation command signal was already sent, the sequencer controller 50 determines that it is time to send the printing operation command signal if 10 seconds have passed since the last printing operation command signal was sent.

Note that when the timing to send the printing operation command signal comes, the sequencer controller 50 determines, based on the state of the rendered data buffered signal input form the inkjet printer 2, if the inkjet printer 2 is in the data-buffered state. If the inkjet printer 2 is not in the data-buffered state, the inkjet printer 2 cannot execute the printing operation based on the printing operation command signal, and the sequencer controller 50 executes a corresponding process. For example, the sequencer controller 50 may wait until the inkjet printer 2 enters the data-buffered state. Alternatively, the sequencer controller 50 may stop sending the printing operation command signal, then control the sequencer display 53 to display that the inkjet printer 2 is not in the data-buffered state on the display means, thereby informing the user that the inkjet printer 2 is not in the data-buffered state.

If it is determined in step SA5 that it is time to send the printing operation command signal (step SA5: YES), the sequencer controller 50 controls the second sequencer communicator 55 to send the printing operation command signal to the inkjet printer 2 (step SA6).

Next, the sequencer controller 50 determines if the printing operation command signal has been sent ten times (step SA7). If not (step SA7: NO), the sequencer controller 50 goes to step SA4. If it has (step SA7: YES), the sequencer controller 50 ends the process.

As shown in flow chart FC, when the sequencer 4 sends the printing operation command signal, the printer controller 30 controls the second interface 37 to receive the printing operation command signal (step SC5).

Next, the printer controller 30, in response to receiving the printing operation command signal, controls the print unit 33 and conveyance unit 34 when the signal is received to start the printing operation based on the print data rendered in the image buffer (step SC6). Driving the inkjet head 10 and conveying the roll paper R are appropriately controlled to print images on the labels R2 in the printing operation, and further description thereof is omitted.

When the printing operation starts, the printer controller 30 changes the voltage level of the printing-in-progress signal output to the sequencer 4 to report the printing state (step SC7).

Next, the printer controller 30 monitors for completion of the printing operation (step SC8).

When the printing operation ends (step SC8: YES), the printer controller 30 changes the voltage level of the printing-in-progress signal output to the sequencer 4 to report the printing state is not active (step SC9).

As described above, the sequencer 4, using the nozzle check operation command signal, cleaning operation command signal, and printing operation command signal, can cause the inkjet printer 2 to execute the cleaning operation, nozzle check operation, and printing operation at appropriate times according to a schedule. More specifically, for the printing operation to print an image on one label R2, the sequencer 4 controls the host computer 3 to send print data to the inkjet printer 2 before sending the printing operation command signal so that the print data is rendered in the image buffer before the printing operation command signal is input to the inkjet head 10. As a result, the sequencer 4 can cause the inkjet printer 2 to execute the printing operation timed to the output of the printing operation command signal.

As described above, an inkjet printer 2 according to this embodiment has a first interface 36 for communicating with a host computer 3 that generates print data for images to be printed on labels R2; a second interface 37 for communicating with a sequencer 4 that sends printing operation command signal specifying the timing for executing a printing operation including printing the print data; and a printer controller 30 (control unit) that renders print data received through the first interface 36, and executes a printing operation based on the rendered print data at a timing based on the printing operation command signal received through the second interface 37.

The second interface 37 receives a specific operation command signal specifying the timing to execute a specific operation that cannot be executed simultaneously to printing print data, and the printer controller 30 executes the specific operation based on the specific operation command signal received through the second interface 37.

Because there are specific operations that cannot be executed at the same time as the printing operation, and these specific operations must also be executed, this configuration enables an inkjet printer 2 to execute a printing operation involving printing labels, and a specific operation different from the printing operation, at appropriate times based on a signal received from the sequencer 4.

In this embodiment of the invention, the inkjet printer 2 executes the maintenance operation based on a specific operation command signal input from the sequencer 4.

Because there are maintenance operations that cannot be executed at the same time as the printing operation, and these maintenance operations must also be executed, this configuration enables an inkjet printer 2 to execute a printing operation involving printing labels, and a maintenance operation different from the printing operation, at appropriate times based on a signal received from the sequencer 4.

In this embodiment of the invention, the inkjet printer 2 executes a cleaning operation based on a cleaning operation command signal input from the sequencer 4. The printer controller 30 caps the inkjet head 10 and suctions ink from the inkjet head 10 in one cleaning operation.

Because there are cleaning operations that cannot be executed at the same time as the printing operation, and these cleaning operations must also be executed, this configuration enables an inkjet printer 2 to execute a printing operation involving printing labels, and a cleaning operation different from the printing operation, at appropriate times based on a signal received from the sequencer 4.

In this embodiment of the invention, the inkjet printer 2 executes a nozzle check operation based on a nozzle check operation command signal input from the sequencer 4. The printer controller 30 ejects ink form the nozzles of the inkjet head 10 to detect ejection problems in one example of a nozzle check operation.

Because there are nozzle check operations that cannot be executed at the same time as the printing operation, and these nozzle check operations must also be executed, this configuration enables an inkjet printer 2 to execute a printing operation involving printing labels, and a nozzle check operation different from the printing operation, at appropriate times based on a signal received from the sequencer 4.

When a maintenance operation is executed based on the specific operation command signal, the second interface 37 in this embodiment sends to the sequencer 4 a signal indicating that the maintenance operation is being executed.

This configuration enables the inkjet printer 2 to inform the sequencer 4 that the maintenance operation is being executed.

When a printing operation is executed based on the printing operation command signal, the second interface 37 in this embodiment sends to the sequencer 4 a signal indicating that the printing operation is being executed.

This configuration enables the inkjet printer 2 to inform the sequencer 4 that the printing operation is being executed.

While certain embodiments are described above, the invention is not limited thereto and can be modified and adapted in many ways without departing from the scope of the accompanying claims.

For example, the printing system 1 is described as being deployed in a factory in the embodiment described above. However, the facilities in which the printing system 1 is used are not limited to factories.

The function blocks described above with reference to the figures can be embodied as desired by the cooperation of hardware and software, and do not require a specific hardware configuration.

When the control method of the inkjet printer 2 embodiment described above (control method of a printing device) is implemented by a computer of the inkjet printer 2 or an external device connected to the inkjet printer 2, the above-described concepts may be embodied by a program executed by the computer to implement the method, a computer-readable recording medium storing the program, or a transmission medium able to transmit the program. Such recording media include magnetic and optical recording media, as well as semiconductor memory devices. Further examples of such recording media include floppy disks, HDD (Hard Disk Drive), CD-ROM (Compact Disk Read Only Memory), DVD (Digital Versatile Disk), Blu-ray® Disc, magneto-optical discs, flash memory, memory card media, and other types of removable and fixed recording media. The recording media may also be an internal storage device of the inkjet printer 2 or an external device connected to the inkjet printer 2, including RAM (Random Access Memory), ROM (Read Only Memory), HDD, and other nonvolatile memory devices.

The above-described embodiments may be varied in many ways. Such variations are not to be regarded as a departure from the spirit and scope of the invention, and all such modifications as would be obvious to one skilled in the art are intended to be included within the scope of the following claims.

What is claimed is:

1. An inkjet printer for printing labels, the inkjet printer comprising:
    a first interface configured to receive, from a host computer, print data for images to be printed on the labels;
    a second interface configured to receive, from a sequencer, a first signal indicating a timing to execute a printing operation that includes printing the images, and a second signal indicating a timing to execute a predetermined operation that cannot be executed in parallel with printing the images; and
    a controller configured to:
        render the print data received via the first interface, and execute the printing operation based on the rendered print data at a timing based on the first signal received via the second interface, and
        execute the predetermined operation at a timing based on the second signal received via the second interface.

2. The inkjet printer described in claim 1, wherein:
the predetermined operation is a maintenance operation that includes ejecting ink from an inkjet head.

3. The inkjet printer described in claim 2, wherein:
the maintenance operation includes a cleaning operation of the inkjet head; and
the controller is configured such that, during the cleaning operation, the controller causes the inkjet head to be capped and causes suction to be applied to the inkjet head.

4. The inkjet printer described in claim 2, wherein:
the maintenance operation includes a nozzle check operation of the inkjet head; and
the controller is configured such that, during the nozzle check operation, the controller causes ink to be ejected from nozzles of the inkjet head and determines whether an ejection problem exists.

5. The inkjet printer described in claim 2, wherein:
the second interface is configured such that, when a maintenance operation based on the second signal is executed, the second interface sends to the sequencer a signal indicating that the maintenance operation is being executed.

6. The inkjet printer described in claim 1, wherein:
the second interface is configured such that, when a printing operation based on the first signal is executed, the second interface sends to the sequencer a signal indicating that the printing operation is being executed.

7. A method of controlling an inkjet printer for printing labels, the method comprising:
    receiving, from a host computer, print data for images to be printed on the labels;
    receiving, from a sequencer, a first signal indicating a timing to execute a printing operation that includes printing the images, and a second signal indicating a timing to execute a predetermined operation that cannot be executed in parallel with printing the images;
    rendering the print data and executing the printing operation based on the rendered print data at a timing based on the first signal; and
    executing the predetermined operation at a timing based on the second signal.

8. The method described in claim 7, wherein:
the predetermined operation is a maintenance operation that includes ejecting ink from an inkjet head.

9. The method described in claim 8, wherein:
the maintenance operation includes a cleaning operation of the inkjet head; and
during the cleaning operation, the controller causes the inkjet head to be capped and causes suction to be applied to the inkjet head.

10. The method described in claim 8, wherein:
the maintenance operation includes a nozzle check operation of the inkjet head; and
during the nozzle check operation, the controller causes ink to be ejected from nozzles of the inkjet head and determines whether an ejection problem exists.

11. The method described in claim 8, wherein:
when a maintenance operation based on the second signal is executed, the second interface sends to the sequencer a signal indicating that the maintenance operation is being executed.

12. The method described in claim 7, wherein:
when a printing operation based on the first signal is executed, the second interface sends to the sequencer a signal indicating that the printing operation is being executed.

13. A printing system comprising:
an inkjet printer configured to print labels;
a host computer configured to generate print data for images to be printed on the labels;
a sequencer configured to send a first signal indicating a timing to execute a printing operation that includes printing the images, and a second signal indicating a timing to execute a predetermined operation that cannot be executed in parallel with printing the images; wherein
wherein the inkjet printer comprises:
  a first interface configured to receive, from the host computer, the print data for the images to be printed on the labels,
  a second interface configured to receive, from the sequencer, the first signal and the second signal, and
  a controller configured to:
    render the print data received via the first interface, and execute a printing operation based on the rendered print data at a timing based on the first signal received via the second interface, and
    execute the predetermined operation at a timing based on the second signal received via the second interface.

14. The printing system described in claim 13, wherein:
the predetermined operation is a maintenance operation that includes ejecting ink from an inkjet head.

15. The printing system described in claim 14, wherein:
the maintenance operation includes a cleaning operation of the inkjet head; and
the controller is configured such that, during the cleaning operation, the controller causes the inkjet head to be capped and causes suction to be applied to the inkjet head.

16. The printing system described in claim 14, wherein:
the maintenance operation includes a nozzle check operation of the inkjet head; and
the controller is configured such that, during the nozzle check operation, the controller causes ink to be ejected from nozzles of the inkjet head and determines whether an ejection problem exists.

17. The printing system described in claim 14, wherein:
the second interface is configured such that, when a maintenance operation based on the second signal is executed, the second interface sends to the sequencer a signal indicating that the maintenance operation is being executed.

18. The printing system described in claim 13, wherein:
the second interface is configured such that, when a printing operation based on the first signal is executed, the second interface sends to the sequencer a signal indicating that the printing operation is being executed.

* * * * *